United States Patent [19]

Itoh et al.

[11] Patent Number: 5,669,231
[45] Date of Patent: Sep. 23, 1997

[54] AIR CONDITIONING APPARATUS

[75] Inventors: Satoshi Itoh, Kariya; Kunio Iritani, Anjo, both of Japan

[73] Assignee: Nippondenso Co., Ltd., Kariya, Japan

[21] Appl. No.: 667,512

[22] Filed: Jun. 21, 1996

[30] Foreign Application Priority Data

Jun. 23, 1995 [JP] Japan .................. 7-157622
Apr. 12, 1996 [JP] Japan .................. 8-091440

[51] Int. Cl.$^6$ ........................................ B60H 1/00
[52] U.S. Cl. ........................ 62/210; 62/213; 62/223
[58] Field of Search ........................ 62/210, 211, 213,
62/204, 222, 223, 176.1, 176.2, 176.6,
244, 164, 230; 165/43, 42, 204; 236/91 C,
44 R, 44 C

[56] References Cited

U.S. PATENT DOCUMENTS

| | | | |
|---|---|---|---|
| 4,354,547 | 10/1982 | Sugiura | 165/43 X |
| 4,848,444 | 7/1989 | Heinle et al. | 62/176.6 X |
| 4,852,363 | 8/1989 | Kampf et al. | 165/202 X |
| 4,917,293 | 4/1990 | Fedter et al. | 62/176.6 X |
| 4,920,755 | 5/1990 | Tadahiro | 62/176.6 X |
| 4,966,012 | 10/1990 | Iida | 62/244 X |
| 5,572,877 | 11/1996 | Ikeda et al. | 454/121 X |

FOREIGN PATENT DOCUMENTS 3170753  7/1991  Japan.

*Primary Examiner*—Harry B. Tanner
*Attorney, Agent, or Firm*—Harness, Dickey & Pierce

[57] ABSTRACT

When a defroster switch is input in a heating operation mode, an opening degree of an electric type of a heating expansion valve is controlled to be smaller when temperature of refrigerant discharged from a compressor is less than a predetermined temperature. Therefore, the supercooling degree of the liquid refrigerant of an indoor heating heat exchanger becomes large, the temperature of the heat exchanger becomes high, so that the temperature of air which is blown from a defroster outlet becomes high. Thus, the defrosting effect of a front windshield glass can be increased. Accordingly, when the defrosting of the front windshield is needed, the defrosting effect is increased as compared with when the defrosting is not needed.

15 Claims, 11 Drawing Sheets

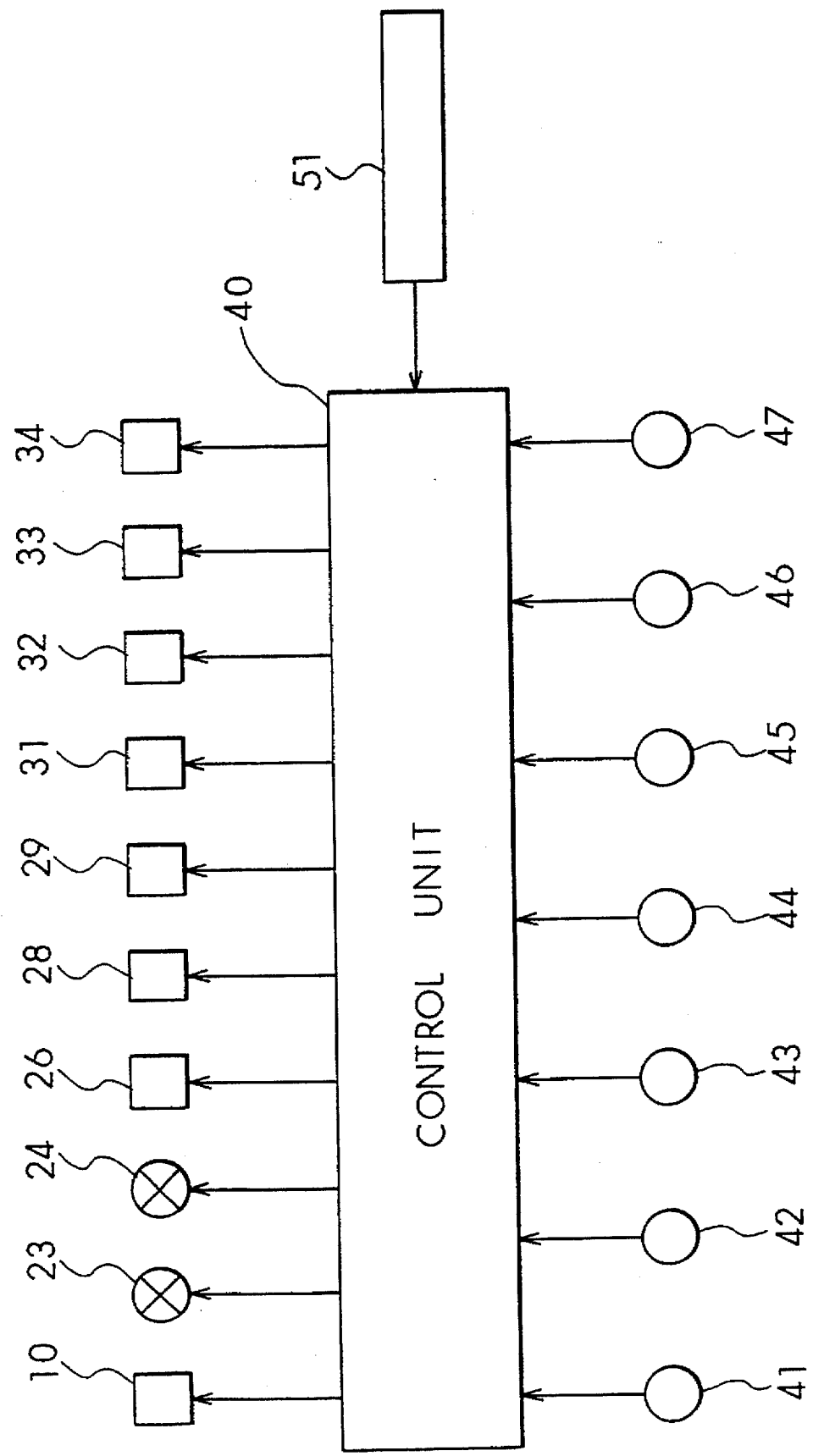

AIR CONDITIONING APPARATUS

CROSS-REFERENCE TO RELATED APPLICATIONS

This application is related to and claims priority from Japanese Patent Application Nos. Hei. 7-157622 filed on Jun. 23, 1995 and Hei. 8-91440 filed on Apr. 12, 1996, the contents of which are hereby incorporated by reference.

BACKGROUND OF THE INVENTION

1. Field of the Invention

The present invention relates to an automotive air conditioner which controls air heating degree of a condenser disposed in an air passage by an opening degree of an electric expansion valve and blows the heated air in the condenser from a defroster air outlet in the defrosting operation mode.

2. Description of Related Art

In a conventional air conditioner described in JP-A-3-170753, the first temperature sensor is located on a refrigerant pipe at the center of a heat exchanger which functions as a condenser of a refrigerating cycle, and the second temperature sensor is located on the refrigerant pipe of an outlet of the condenser. The supercooling degree of a condensed liquid refrigerant in the condenser is calculated by difference between the temperatures detected by each of the temperature sensors, and the opening degree of an electronic expansion valve is so controlled that the calculated supercooling degree is kept in a certain range.

In the air conditioner in which the air in the air passage for directing air into a passenger compartment is heated by the heat of condensation of the condenser, for example, in the automotive air conditioner in which the condenser is disposed in the air passage, when the supercooling degree of the certain range is so set that the coefficient of performance of the refrigerating cycle becomes as large as possible, and when the opening degree of the electronic expansion valve is so controlled that the supercooling degree is kept in the certain range, the air conditioner is operated with economical electric power in the regular cooling and heating mode, however, the air conditioning capacity is not enough in defrosting the windshield. As a result, the air conditioning operation for defrosting the windshield cannot be performed.

Particularly, in the winter, an outside air introduction mode is generally used for defrosting. In this case, a low temperature outside (fresh) air is introduced at the intake side of the condenser, so that the load on the condenser becomes large. Therefore, the above-described problem is likely to occur.

SUMMARY OF THE INVENTION

In view of the above problem, it is an object of the present invention to provide an air conditioning apparatus, in which the air in the air passage for directing into the passenger compartment is heated by the heat of condensation of the condenser and the heating degree in the condenser is further controlled by an opening degree of an electric expansion valve, capable of increasing the defrosting effect when the defrosting the windshield is needed as compared with the case where the defrosting operation is not needed.

According to the present invention, refrigerant in a refrigerating cycle is compressed by a compressor, is condensed in a condenser, is decompressed and expanded in an expansion valve, is evaporated in an evaporator, then, is returned into the compressor and the refrigerant is compressed. When defrosting instruction signals generating means does not generate a defrosting instruction signal, the opening degree of an electric expansion valve becomes a first opening degree. When the defrosting instruction signal generating means generates the defrosting instruction signal, that is, in defrosting mode, the opening degree of the electric expansion valve becomes the second opening degree which is less than the first opening degree.

Here, the defrosting means that the cloud of a vehicle windshield is prevented beforehand, it is needless to say, it means that generated cloud thereof is removed, as well as means that the ice of the outer surface of the vehicle windshield is thawed.

Thus, when the defrosting instruction signal is generated, as compared with when the defrosting instruction signal is not generated, the opening degree of the electric expansion valve becomes small and the pressure of the refrigerant in the condenser becomes high. As a result, the refrigerant temperature in the condenser becomes high, so that the air in the air passage is more heated by heat of the condensation by the condenser, therefore, the temperature of air which is blown from a defroster air outlet toward the inside surface of the vehicle windshield becomes high.

When the defrosting instruction signal generating means generates the defrosting instruction signal to perform the defrosting of the windshield, the opening degree of the electric expansion valve is made smaller than the ordinary mode, and the temperature of air blown from the defroster outlet is made high, so that the present invention can obtain a higher defrosting effect.

Further, the first opening degree may be set to an opening degree in which the coefficient of performance of the refrigerating cycle is maximized.

Thus, it is needless to say that the defrosting effect of the windshield is increased in the defrosting mode for defrosting the windshield, further, in the ordinary operation mode other than defrosting of the windshield, the refrigerating cycle is so driven that the coefficient of performance is maximized, so that the power saving effect of the refrigerating cycle can be increased.

Still further, the first opening degree may be an opening degree in which the supercooling degree of the liquid refrigerant in the condenser becomes a predetermined value.

Furthermore, the first opening degree may be an opening degree in which the heating degree detected by the heating degree detecting means becomes a predetermined value.

Moreover, the second opening degree may be an opening degree in which the heating degree determined by the heating degree determining means is larger than a predetermined value.

If the heating degree of the condenser is larger than the predetermined value, the defrosting of the windshield can be sufficiently performed when the air in the air passage which is heated by the heat of the condensation by the condenser is blown from the defroster air outlet toward the inside surface of the vehicle windshield.

Further, the second opening degree may be an opening degree in which the discharge refrigerant temperature detected by the discharge temperature detecting means becomes a predetermined value.

If the discharge refrigerant temperature is the predetermined value, the defrosting of the windshield can be sufficiently performed when the air in the air passage which is heated by the heat of condensation by the condenser is blown from the defroster air outlet toward the inside surface of the windshield.

Thus, when the defrosting instruction signal generating means generates the defrosting instruction signal to perform the defrosting of the windshield, the opening degree of the electric expansion valve becomes an opening degree in which the discharge refrigerant temperature becomes the above-described predetermined value, so that the defrosting of the windshield can be sufficiently performed. That is, the discharge refrigerant temperature only increases to the above-described predetermined value, and the discharge refrigerant temperature is not increased more than necessary, therefore, the consumed electric power of the electric motor can be made minimized.

Further, the second opening degree may be an opening degree in which the electric current detected by electric current detecting means becomes a predetermined value.

When the electric current supplied to the inverter is less than the predetermined value, the amount of the heat generated by the inverter is controlled, so that the inverter can be normally kept on operating. Thus, in the defrosting mode, the warm air can be blown to the inside surface of the windshield as long as inverter can be normally operated.

When the defrosting instruction signal is generated and the outside air temperature is more than a predetermined value, the opening degree of the electric expansion valve becomes the first opening degree. When the defrosting instruction signal is generated and the outside air temperature is less than the predetermined value, the opening degree of the electric expansion valve becomes the second opening degree.

When the outside air temperature is less than the predetermined value, in the ordinary operation mode without the defrosting instruction signal, the defrosting of the windshield cannot be sufficiently performed.

Even if there is the defrosting instruction signal, further, when the outside air temperature is less than the predetermined value, that is, when the defrosting of the windshield cannot be sufficiently performed, the opening degree of the electric expansion valve specially becomes the second opening degree. That is, even if there is the defrosting instruction signal, however, when the outside air temperature is more than the predetermined value, the opening degree of the electric expansion valve becomes the first opening degree. Thus, the increase of the consumed electric power of the compressor accompanied with the opening degree of the electric expansion valve changing to the second opening degree can be minimized.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a block diagram of a control system of the first embodiment;

DETAILED DESCRIPTION OF THE PREFERRED EMBODIMENTS

A first embodiment in which the present invention is applied to an air conditioner for electric vehicles will now be described with reference to FIGS. 1 through 14.

Figure 1:
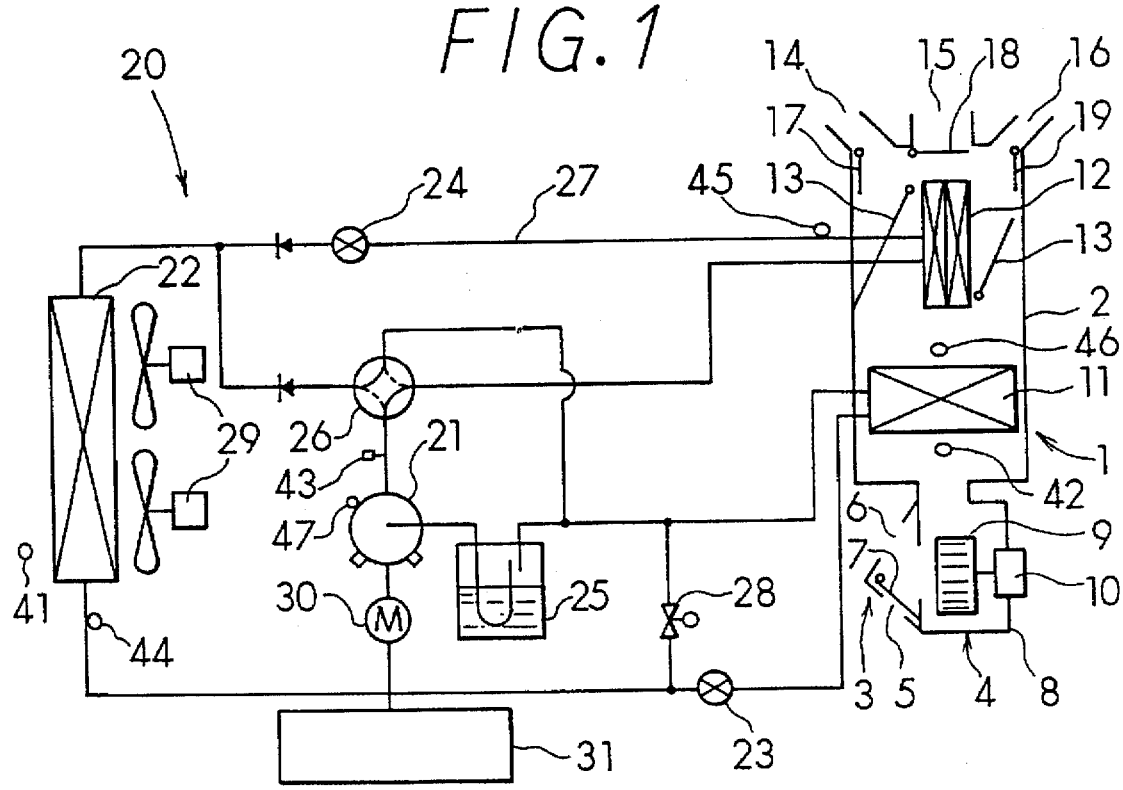
FIG. 1 is an overall construction view according to a first embodiment of the present invention.

In FIG. 1, an air conditioning duct 2 in an air conditioning unit 1 forms an air passage therein for introducing air into a passenger compartment. In the air conditioning duct 2, an inside/outside air switching means 3 and air blowing means 4 are provided on one side, and a plurality of air outlets 14 through 16 is formed so as to open to the passenger compartment on the other side.

The inside/outside air switching means 3 is provided with an inside/outside air switching door 7 within a inside/outside air switching box to selectively open/close the inside air inlet 5 for taking in the air from the inside of the passenger compartment (i.e., inside air) and an outside air inlet 6 for taking in air from the outside of the passenger compartment (i.e., outside air), both the inlets 5 and 6 being formed in the inside/outside air selected box and the inside/outside air selecting door 7 being driven by a dedicated driving means (e.g., servo motor, not illustrated).

The air blowing means 4 generates air flow in the air conditioning duct 2 from the inside air inlet 5 or outside air inlet 6 to the air outlets 14 through 16. Specifically, a multiblade fan 9 is located in a scroll casing 8 and the multiblade fan 9 is driven by a blower motor 10.

An indoor cooling heat exchanger 11 is located in the air conditioning duct 2 on the downstream side from the multiblade fan 9. The indoor cooling heat exchanger 11 forms a part of a refrigerating cycle 20 (described later) and functions when the operation is in a cooling mode (described later) as an evaporator for dehumidifying and cooling the air in the air conditioning duct 2 by the endothermic action of the refrigerant flowing therethrough. When the operation is in a heating mode, however, the refrigerant does not flow into the indoor cooling heat exchanger 11.

Further, an indoor heating heat exchanger 12 is located in the air conditioning duct 2 on the downstream side from the indoor cooling heat exchanger 11. The indoor heating heat exchanger 12 forms a part of a refrigerating cycle 20 and functions when the operation is in a heating mode (described later) as a condenser for heating the air in the air conditioning duct 2 by the radiative action of the refrigerant flowing therethrough. When the operation is in the cooling mode, however, the refrigerant does not flow into the indoor heating heat exchanger 12.

Further, an air mix door 13 is located in a position adjacent to the indoor heating heat exchanger 12 in the air conditioning duct 2 to regulate the flow amount of the air supplied from the multiblade fan 9 to flow through the indoor heating heat exchanger 12 and the flow amount of the air supplied from the multiblade fan 9 to bypass the indoor heating heat exchanger 12.

The above-described air outlets 14 through 16 are specifically a defroster air outlet 14 for blowing the conditioned air toward the inside surface of the vehicle windshield, a face air outlet 15 for blowing the conditioned air toward the upper half of the bodies of the driver and passengers in the passenger compartment, and a foot air outlet 16 for blowing the conditioned air toward the lower half of the driver and passengers in the passenger compartment. Upstream of these outlets 14 through 16, there are arranged doors 17 through 19 respectively to open/close the respective air outlets 14 through 16. Further, these doors 17 through 19 are respectively driven by respective driving means 32 through 34 (specifically, servo motors illustrated in FIG. 2).

Here, the refrigerating cycle 20 is a heat pump type cycle in which the inside of the passenger compartment is cooled or heated by the indoor cooling heat exchanger 11 and the indoor heating heat exchanger 12. In addition to these heat exchangers 11 and 12, the refrigerating cycle 20 includes a refrigerant compressor 21, an outdoor heat exchanger 22, a cooling pressure reducer 23 (cooling expansion valve), a heating pressure reducer 24 (heating expansion valve), accumulator 25 and a four-way valve 26 which selects the flow of the refrigerant, all of which is mutually connected with a refrigerant pipe 27. In FIG. 1, the reference numeral 28 denotes a solenoid valve, and the reference numeral 29 denotes an outdoor fan.

The above-described outdoor heat exchanger functions as a condenser when the operation is in a cooling mode (described later).

When the refrigerant compressor 21 is driven by an electric motor 30, the refrigerant compressor 21 takes in, compresses and exhaust the refrigerant. The electric motor 30 is arranged integrally with the refrigerant compressor 21 in a sealed-up casing. The rotational speed of the electric motor 30 continuously varies by the control of an inverter 31. Power supply to the inverter 31 is controlled by an electronic control unit (ECU) 40 (FIG. 2).

Further, both the cooling pressure reducer 23 and the heating pressure reducer 24 are electric type expansion valves in which each valve opening degree varies by control of the electronic control unit 40 (FIG. 2).

As shown in FIG. 2, in the ECU 40, signals are input from an outside air temperature sensor 41 for detecting the temperature of the outside air, an inlet temperature sensor 42 for detecting the temperature of the air of inlet side of the indoor heating heat exchanger 12 (specifically, inlet side of the indoor cooling heat exchanger 11), a discharge pressure sensor 43 for detecting the pressure of the refrigerant discharged from the refrigerant compressor 21, and a cooling outlet temperature sensor 44 for detecting the temperature of the refrigerant after passing through the outdoor heat exchanger 22.

In the ECU 40, signals are input from a heating outlet temperature sensor 45 for detecting the refrigerant temperature of the refrigerant after passing through the indoor heating heat exchanger 12, a post-evaporator sensor 46 for detecting air cooling degree of the indoor cooling heat exchanger 11 (specifically, the temperature of the air immediately after passing through the indoor cooling heat exchanger 11), and a discharge temperature sensor 47 for detecting the temperature of the refrigerant discharged from the compressor 21. Signals from each lever and switch of a control panel 51 which is located at the front of the passenger compartment is also input into the ECU 40.

The discharge pressure sensor 43 is located in a discharge pipe between the compressor 21 and the four-way valve 26. Further, the cooling outlet temperature sensor 44 is covered with a heat insulation material or the like, so that the error in the detection of the refrigerant temperature becomes small, then the cooling outlet temperature sensor 44 is closely fixed by a clamp or the like on the surface of the outlet pipe of the outdoor heat exchanger 22. Similarly, the heating outlet temperature sensor 45 is covered with a heat insulation material or the like, so that the error in the detection of the refrigerant temperature becomes small, then the heating outlet temperature sensor 45 is closely fixed by a clamp or the like on the surface of the outlet pipe of the indoor heating heat exchanger 12.

Figure 3:
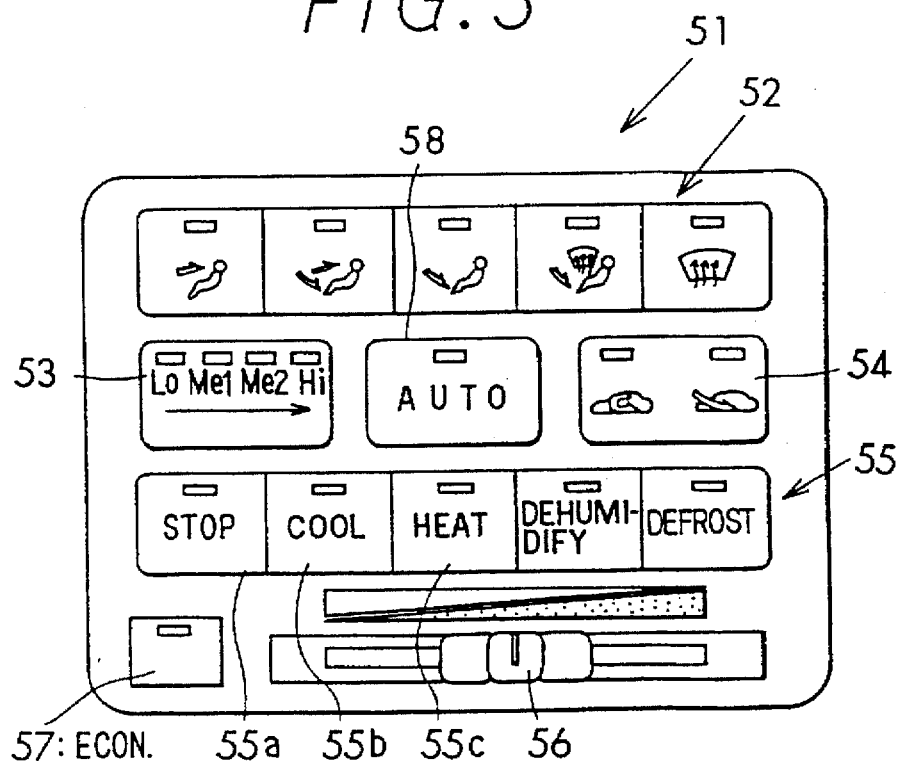
FIG. 3 is a front view of a control panel of the first embodiment.

As shown in FIG. 3, the control panel 51 is provided with a blow mode setting switch 52 for setting blow mode, an air flow amount setting switch 53 for setting the flow amount of the air blown into the passenger compartment, an inside/outside air switching switch 54 for setting the inside/outside air mode, an operation mode setting switch 55 for setting the operation mode of the refrigerating cycle 20, a temperature setting lever 56 for setting the temperature of the air blown into the passenger compartment, and a power saving switch 57 for setting the power saving mode of the consumed electric power of the electric motor 30.

The blow mode setting switch 52 includes a face switch 52a selecting a face mode which blows the conditioned air from the face air outlet 15, a bi-level switch 52b selecting a bi-level mode which blows the conditioned air from the face air outlet 15 and the foot air outlet 16, a foot switch 52c selecting a foot mode which blows the conditioned air from the foot air outlet 16, a foot defroster switch 52d selecting a foot defroster mode which blows the conditioned air from the foot air outlet 16 and defroster air outlet 14, and a defroster switch 52e selecting a defroster mode which blows the conditioned air from the defroster air outlet 14.

The defroster switch 52e is a switch which instructs prevention of cloud, defogging, and defrosting of the vehicle windshield.

The operation mode setting switch 55 includes a stop switch 55a for stopping the operation of the compressor 21, a cooling switch 55b for setting the operation mode of the refrigerating cycle 20 to the cooling operation mode, a heating switch 55c for setting the operation mode of the refrigerating cycle 20 to the heating operation mode, and the like.

The above-described temperature setting lever 56 sets a target temperature in the passenger compartment by a driver or a passenger in the passenger compartment. According to the setting position of the temperature setting lever 56, in the cooling operation mode, the ECU 40 determines the target value of the air cooling degree of the indoor cooling heat exchanger 11 (specifically, the temperature of the air immediately after passing through the indoor cooling heat exchanger 11). Further, according to the setting position of the temperature setting lever 56, in the heating operation mode, the ECU 40 determines the target value of the air heating degree of the indoor heating heat exchanger 12 (specifically, the temperature of the refrigerant discharged from the compressor 21).

The ECU 40 controls the inverter 31 in such a way that the detected value of the post-evaporator sensor 46 is controlled to the target value in the cooling operation mode and the detected value of the discharge pressure sensor is controlled to the target value in the heating operation mode. Further, when the defroster switch 52e is input, the ECU 40 controls the servo motors to be set to the defroster mode.

A well-known microcomputer (not shown) which includes CPU, ROM, RAM and other components is incorporated in the ECU 40. The signal from each of the sensors 41 through 47 and the signals from the control panel 51 are input respectively into the microcomputer through an input circuit (not shown) in the ECU 40.

This microcomputer executes a specified process (described herein later). Based on the results of the execution, the microcomputer controls the blower motor 10, the cooling pressure reducer 23, the heating pressure reducer 24, the solenoid valve 28, outdoor fan 29, the inverter 31, and the servo motors 32 through 34. Here, electric power is supplied to the ECU 40 from a battery (not shown).

When the cooling switch 55b is pressed by a driver or a passenger in the passenger compartment, the microcomputer starts up the compressor 21 and controls the four-way valve 26 and the solenoid valve 28 in such a way that the refrigerating cycle 20 is set to the cooling operation mode. In the cooling operation mode, the refrigerant flows through the compressor 21, the outdoor heat exchanger 22, the cooling pressure reducer 23, the indoor cooling heat exchanger 11, the accumulator 25, and the compressor 21 in this order.

When the heating switch 55c is pressed by a driver or a passenger in the passenger compartment, the microcomputer starts up the compressor 21 and controls the four-way valve 26 and the solenoid valve 28 in such a way that the refrigerating cycle 20 is set to the cooling operation mode. In the heating operation mode, the refrigerant flows through the compressor 21, the indoor heating heat exchanger 12, the heating pressure reducer 24, the outdoor heat exchanger 22, the solenoid valve 28, the accumulator 25, and the compressor 21 in this order.

Figure 4:
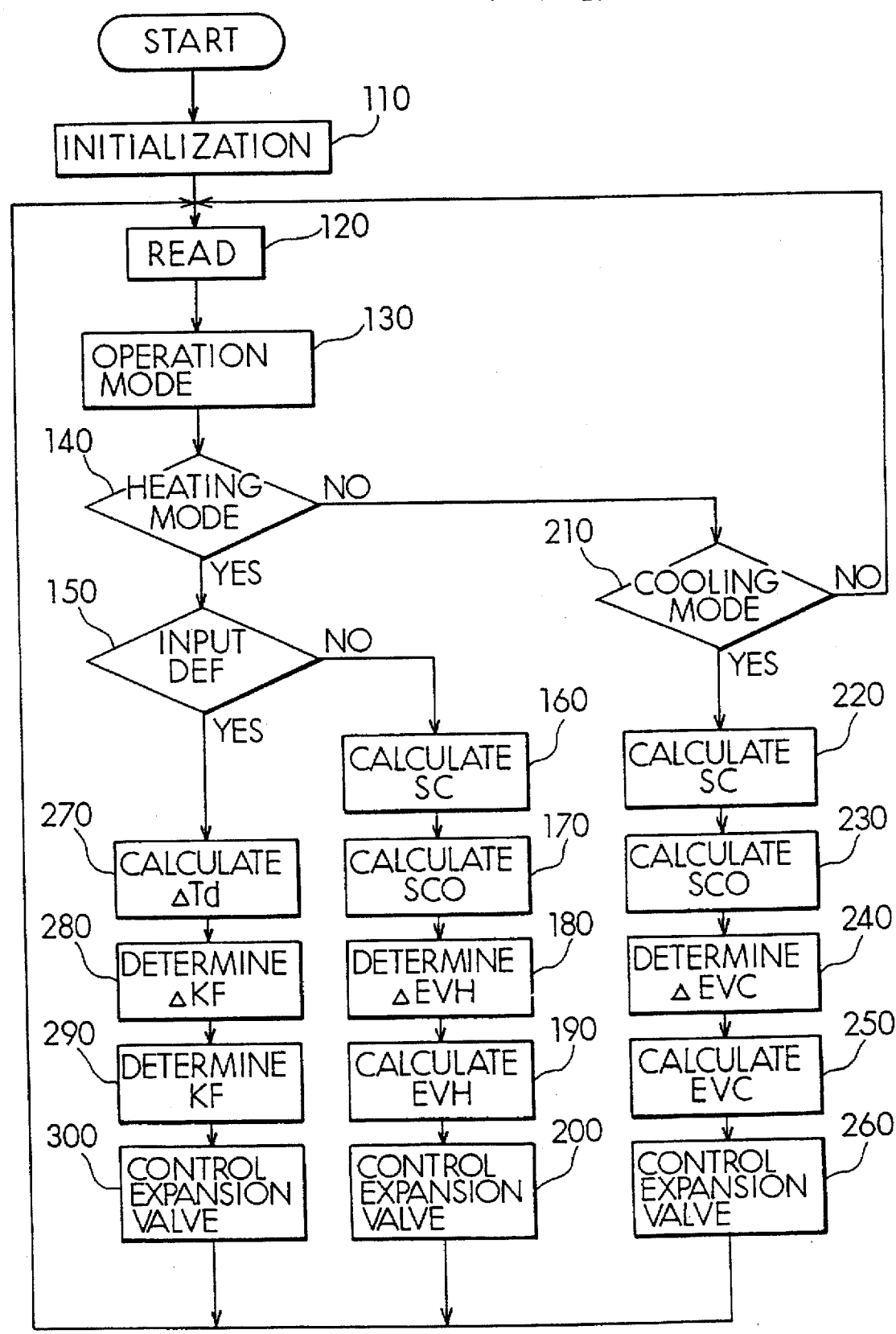
FIG. 4 is a flow chart showing a control process of a pressure reducer of the first embodiment.

Referring to FIG. 4, the control process of the pressure reducers 23 and 24 by the microcomputer will be described.

Firstly, when the key switch is turned ON and the main electric power is supplied to the ECU 40, the routine shown in FIG. 4 starts. In the first step 110, the initialization is performed. Then, in the step 120, the signals from the sensors 41 through 47 and the control panel 51 are read respectively.

In the next step 130, according to the input state of the operation mode setting switch 55 read in the step 120, the operation mode of the refrigerating cycle 20 is determined. For example, when the cooling switch 55b is input, the refrigerating cycle 20 is determined to be the cooling operation mode, when the heating switch 55b is input, the refrigerating cycle 20 is determined to be the heating operation mode.

In the step 140, it is determined whether or not the operation mode determined in the step 130 is in the heating operation mode. Further, in the step 150, it is determined whether or not the defroster switch 52e is in the on position.

When the determination is YES in both the steps 140 and 150, the steps 270 through 300, which is the main feature of the present invention, are performed. When the determination is NO in any one of the steps 140 and 150, the steps 160 through 200 or the steps 210 through 260 are performed.

Firstly, the process of the steps 160 through 200 will be described. Secondly, the process of the steps 210 through 260 will be described. Lastly, the process of the steps 270 through 300, which is the main feature of the first embodiment, will be described.

When the determination is YES in the step 140 and the determination is NO in the step 150, that is, when it is the ordinary heating operation mode without inputting the defroster switch 52e, the supercooling degree (SC) of the condensate refrigerant of the indoor heating heat exchanger 12 is firstly calculated by the following equation (1) in the step 160.

$$SC = f(Pd) - Tcs \tag{1}$$

wherein, the f(Pd) is a condensed temperature which is calculated by detected value of the discharge pressure sensor 43, Tcs is a detected value of the heating outlet temperature sensor 45.

That is, the discharge refrigerant pressure which is detected by the discharge pressure sensor 43 is a pressure at the point "A" in the Mollier diagram (FIG. 5) of the refrigerating cycle 20. That is, the discharge refrigerant pressure is a pressure at the point "B". In the first embodiment, since the pressure at the point "B" is obtained by the detected value of the discharge pressure sensor 43, the condensed temperature at the point "B" is obtained by the map which shows the relationship between the condensed temperature and the refrigerant pressure (not shown) which is stored in ROM. The condensed temperature at the point "B" is the above-described f(Pd).

Figure 5:
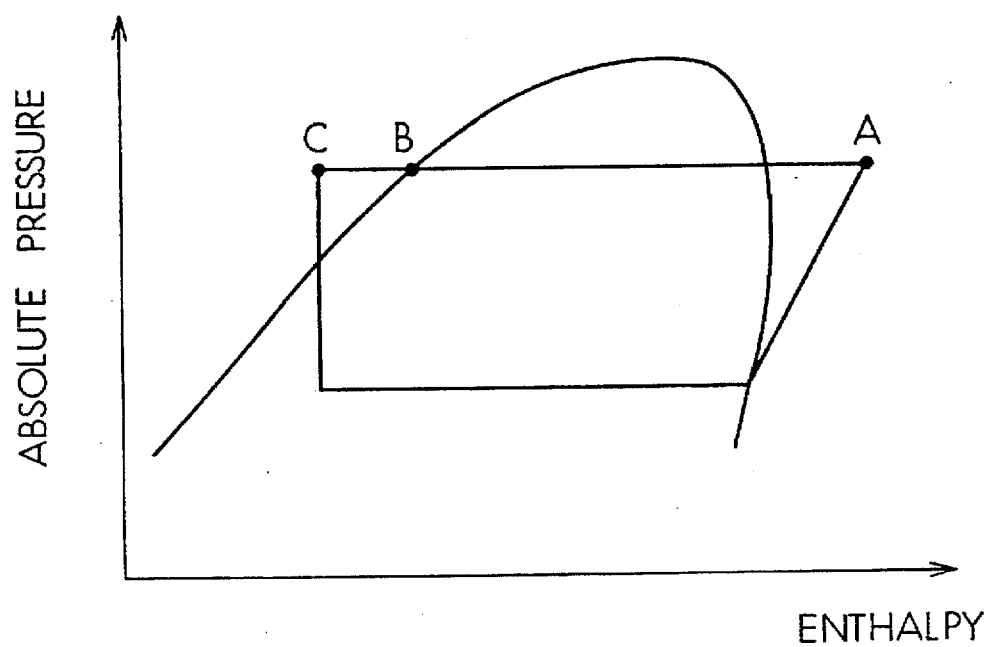
FIG. 5 is a Mollier diagrammatic view of a refrigerating cycle of the first embodiment.

The refrigerant temperature detected by the heating outlet temperature sensor 45 is a temperature at the point "C" in FIG. 5. Thus, in the first embodiment, by the calculation of the equation (1), the difference between the refrigerant temperature of the point "B" and the refrigerant temperature at the point "C" in FIG. 5 is calculated, that is, SC is calculated.

In the step 170, the target value (SCO) of the supercooling degree is so calculated that the efficiency of refrigerating cycle 20 becomes as large as possible, to improve the power saving effect. Specifically, while the heat radiation ability Q of the indoor heating heat exchanger 12 is optimized, the coefficient of performance (=the heat radiation ability Q/the power W of the compressor 12) of the refrigerating cycle 20 is maximized.

Figure 6:
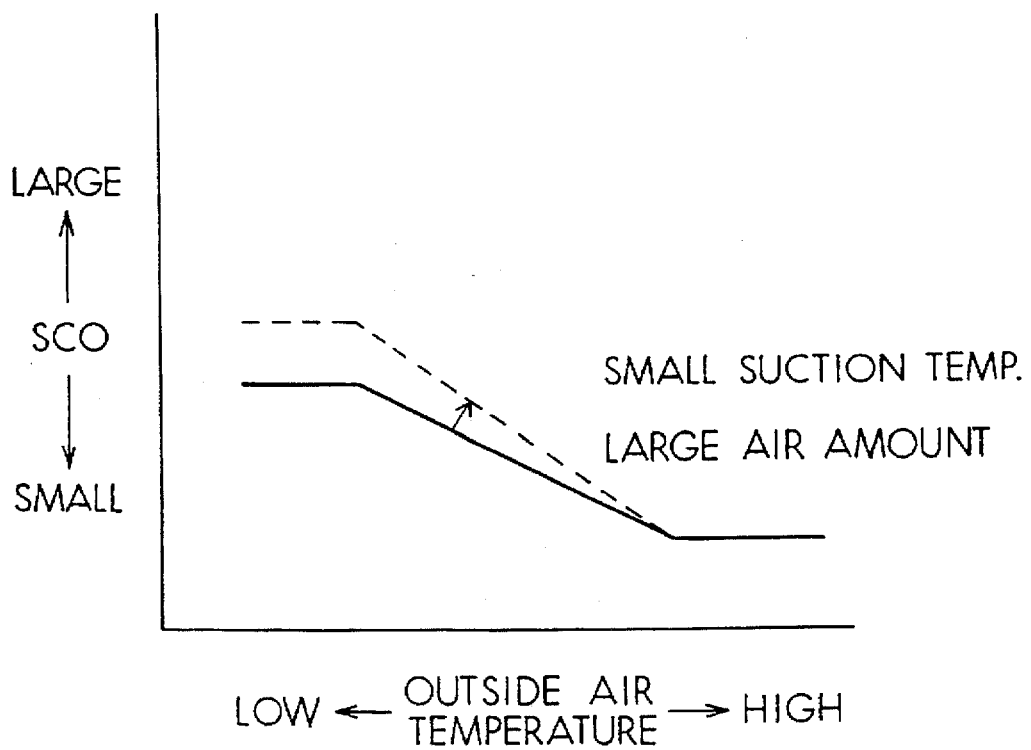
FIG. 6 is a map showing relationships between each environmental factor and target supercooling degree in a heating operation mode of the first embodiment.

The SCO is calculated by the signals from the outside air temperature sensor 41, the inlet temperature sensor 42, and the air flow amount setting switch 53. As shown in FIG. 6, the lower the outside air temperature and the inlet side air temperature of the indoor heating heat exchanger 12 and the larger air flow amount passing through the indoor heating heat exchanger 12 are, the larger SCO is.

That is, in the winter having a low temperature outside air, the outside air introduction mode is generally used for defrosting. Thus, in this case, the lower the outside air temperature is, the lower the inlet side air temperature of the indoor heating heat exchanger 12 is. That is, the temperature of the air passing through the indoor heating heat exchanger 12 becomes low. What the temperature of the air passing through the indoor heating heat exchanger 12 is low means that the difference between the temperature of the refrigerant in the indoor heating heat exchanger 12 and the temperature of the air passing through the indoor heating heat exchanger 12 is large, that is, the heat radiation ability Q is large.

Figure 7:
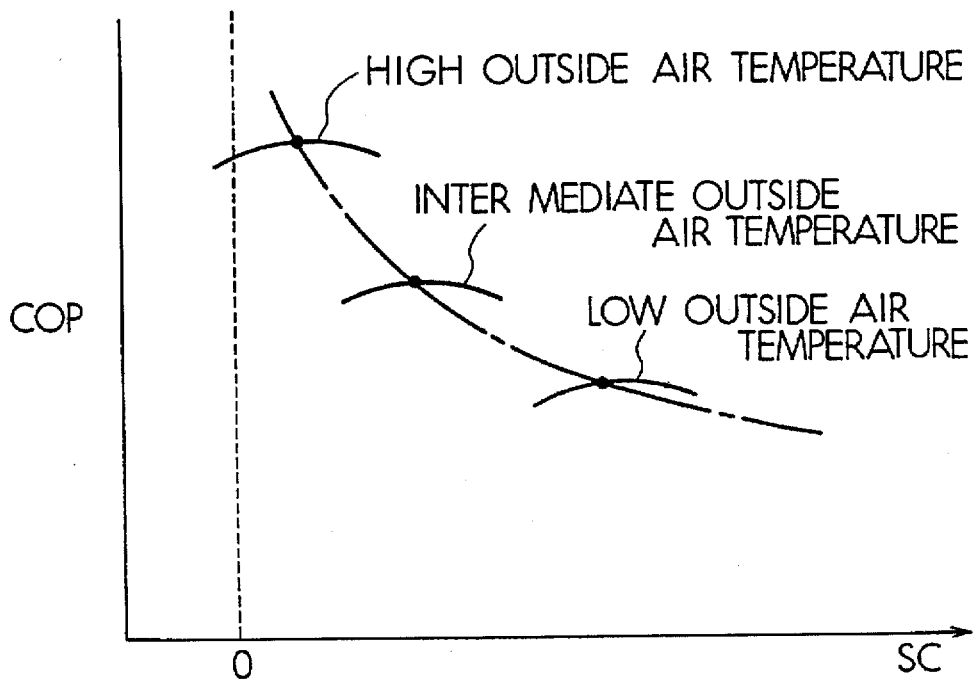
FIG. 7 is a graph showing relationships between supercooling degree SC and coefficient of performance COP of refrigerating cycle in each outside air temperature.

Thus, when the temperature of the air of the inlet side of the indoor heating heat exchanger 12 is low, if the SCO is calculated as a larger value, the increase of the heat radiation ability Q becomes larger than that of the power W so that the coefficient of performance (COP) becomes large. On the other hand, when the temperature of the air of the inlet side of the indoor heating heat exchanger 12 is high, if the SCO is calculated as a larger value, the COP becomes small. That is, as shown by the solid line in FIG. 7, when the temperature of the outside air is high, the SC having the largest COP becomes small. When the temperature of the outside air is low, the SC having the largest COP becomes large. The chain line with one dot in FIG. 7 is a line of connecting the points in which the COP becomes the largest.

Thus, as shown in FIG. 6, when the temperature of the outside air or the temperature of the inlet side is low, the SCO is calculated as a larger value, as compared with when the temperature of the outside air or the temperature of the inlet side is high, Further, the larger the flow amount of air passing through the indoor heating heat exchanger 12 is, the lower the pressure of high-pressure is. When the flow amount of the air is large, the basic pressure of high-pressure is lower as compared with a small flow amount of the air. Therefore, when the SCO is calculated as a larger value to increase the ability Q, although the power W becomes large, however, the basic power W is small. As a result, the coefficient of performance becomes large. Thus, when the flow amount of the air flowing through the indoor heating heat exchanger 12 is large, the SCO is calculated as a larger value.

Figure 8:
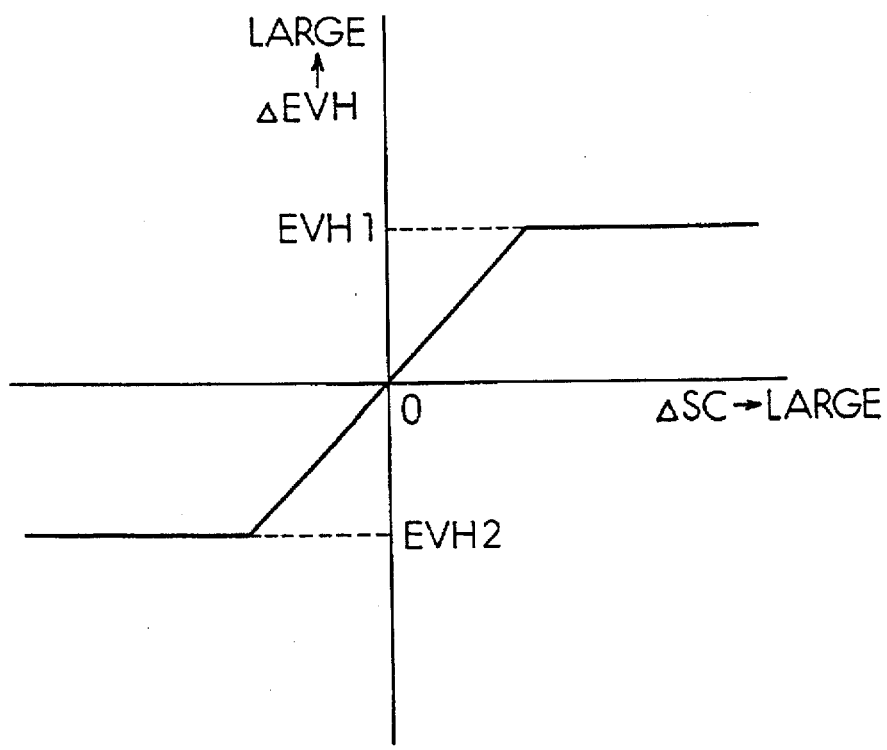
FIG. 8 is a map showing relationships between deviation $\Delta SC$ and increase and decrease opening degree $\Delta EVH$ of the heating pressure reducer in the heating operation mode of the first embodiment.

In the step 180, firstly, the deviation ΔSC (=SC–SCO) between SC and SCO is calculated, secondly increased value ΔEVH of a valve opening degree of the heating pressure reducer 24 according to the deviation ΔSC is calculated by the map in FIG. 8 which is stored in ROM. The upper limit EVH1 and the lower limit EVH2 of the ΔEVH are determined to prevent the hunting of the SC.

In the step 190, the expansion valve opening degree EVH is calculated by adding the ΔEVH to the present expansion valve opening degree. In the step 200, the heating pressure reducer 24 is so controlled that the real opening degree becomes to the EVH. Then, it is returned to the step 120.

On the other hand, when the determination is NO in the step 140, the process is jumped to the step 210, then it is determined whether or not the operation mode which is determined in the step 130 is the cooling operation mode. When the determination is NO in the step 210, that is, when the operation mode is not the heating operation mode and the cooling operation mode, it is returned to the step 120. When the determination is YES in the step 210, the supercooling degree SC of the condensed liquid refrigerant in the outdoor heat exchanger 22 is calculated by the following equation (2) in the next step 220.

$$SC = f(Pd) - Tos \qquad (2)$$

wherein, Tos is a detected value of the cooling outlet temperature sensor 44.

Figure 9:
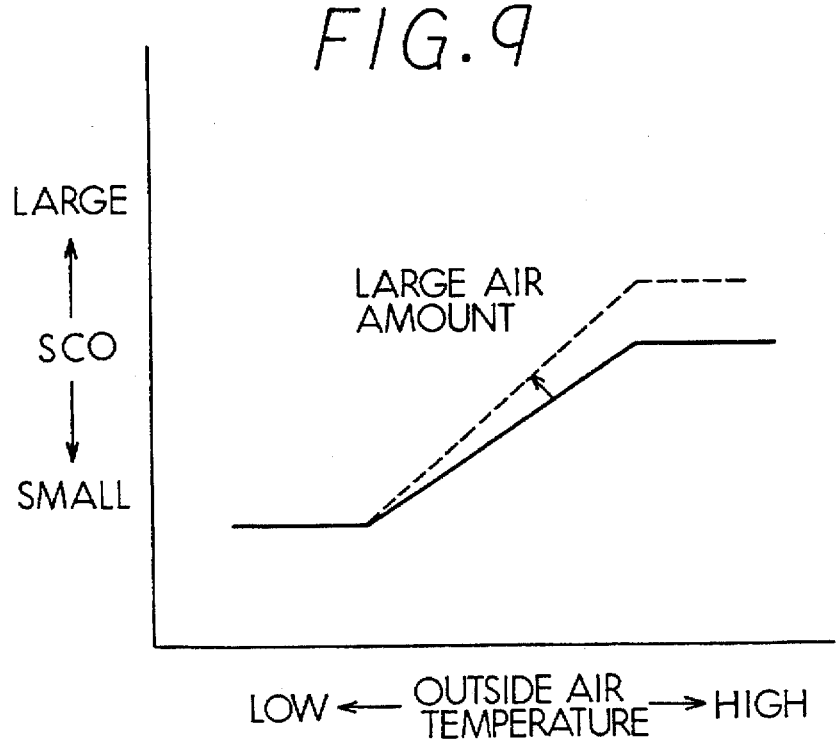
FIG. 9 is a map showing relationships between each environmental factor and the target supercooling degree SCO in a cooling operation mode of the first embodiment.

Then, in the step 230, the target value (SCO) of the supercooling degree is calculated. As shown in FIG. 9, the higher the temperature of the fresh air or the larger the flow amount of the air flowing through the indoor cooling heat exchanger 11 is, the larger SCO is.

That is, in the summer having a high temperature of outside air, when the temperature of the outside air becomes high, the compressor 21 for cooling the passenger compartment is more operated to ensure the cooling ability. Thus, the high-pressure becomes high, so that the temperature of the refrigerant in the outdoor heat exchanger 22 becomes high. As a result, the difference of the temperature between the refrigerant temperature and the outside air temperature becomes large. That is, the heat radiation ability Q in the outdoor heat exchanger 22 becomes large.

Thus, although the SCO is calculated as a larger value, and as a result, the power W of the compressor 21 becomes large, the heat radiation ability Q becomes larger than the power W of the compressor 21. Therefore, when the temperature of the outside air is high, the coefficient of performance (COP) becomes large as compared with the case when the outside air is low, the SCO is calculated as a larger value.

Further, the larger the flow amount of the air flowing through the indoor cooling heat exchanger 11 is, the larger the heat absorbing amount in the indoor cooling heat exchanger 11, so that the heat radiation amount in the outdoor heat exchanger 22 also becomes large. Thus, even when the SCO is calculated as a larger value, and as a result, the power W becomes large, the heat radiation ability Q becomes larger than the power W. Therefore, in such a case, the SCO is calculated as a larger value.

Figure 10:
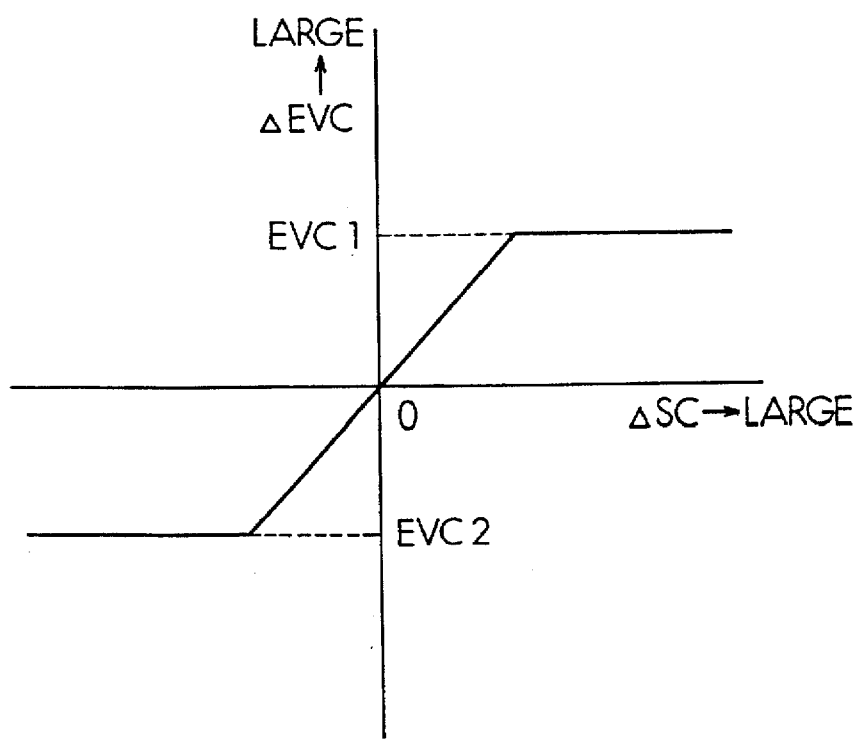
FIG. 10 is a map showing relationship between the deviation $\Delta SC$ and the increase and decrease opening degree $\Delta EVH$ of the cooling pressure reducer in the cooling operation mode of the first embodiment.

In the step 240, firstly, the deviation ΔSC (=SC–SCO) between SC and SCO is calculated, secondly increase and decrease value ΔEVH of the valve opening degree of the cooling pressure reducer 23 according to the deviation ΔSC is calculated by the map in FIG. 10 which is stored in ROM. The upper limit EVH1 and the lower limit EVH2 of the ΔEVH are determined to prevent the hunting of the SC.

In the step 250, the expansion valve opening degree EVH is calculated by adding the ΔEVH to the present expansion valve opening degree. In the step 260, the cooling pressure reducer 23 is so controlled that the real opening degree becomes to the EVH. Then, it is returned to the step 120.

When the determination is YES in both the steps 140 and 150, that is, when it is the heating operation mode and the defroster switch 52e is input, the process of the steps 270 through 300, which is the main feature of the first embodiment, are performed. Specifically, firstly, a deviation of the discharge temperature ΔTd is calculated by the following equation (3) in the step 270.

$$\Delta Td = Td1 - T1 \qquad (3)$$

wherein, Td1 is an discharge refrigerant temperature which is detected by the discharge temperature sensor 47, T1 is a setting temperature which is set in advance as an enough temperature to perform the defrosting of the front windshield glass. That is, when the discharge refrigerant temperature is more than the T1, the warm air passing through the indoor heating heat exchanger 12 is blown from the defroster air outlet 14 toward the inside surface of the front windshield glass, so that the defrosting of the front windshield glass can be sufficiently performed.

Figure 11:
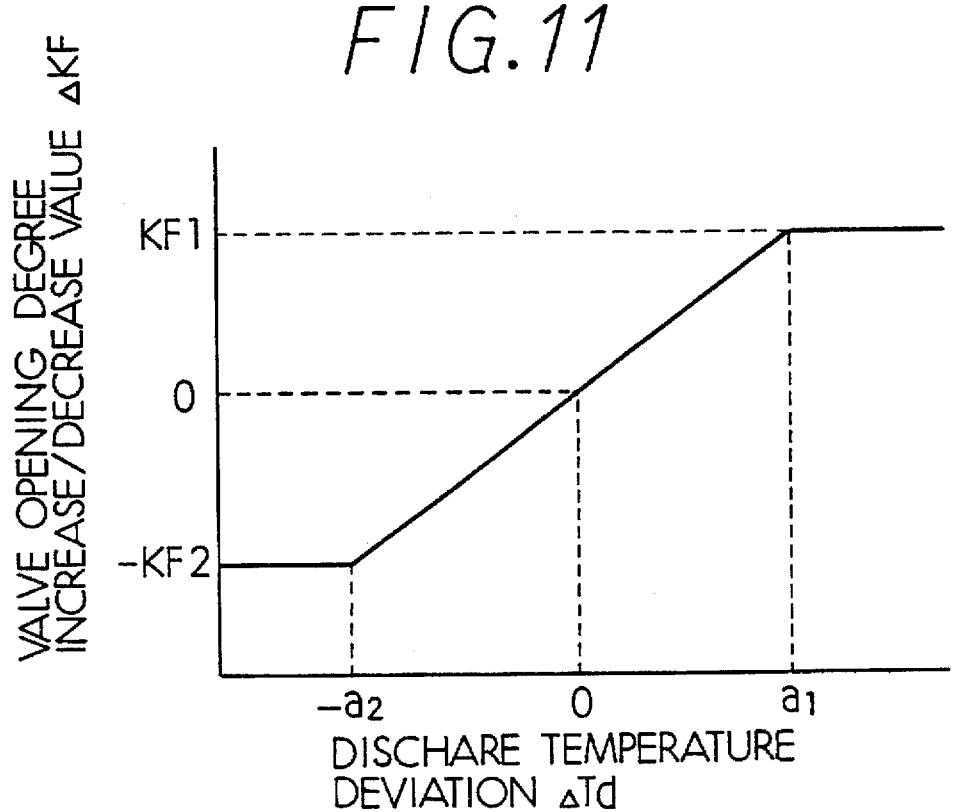
FIG. 11 is a map showing relationship between deviation $\Delta Td$ of discharge temperature and increase and decrease value of the pressure reducer opening degree.

In the step 280, the increase and decrease value ΔKF of a valve opening degree of the heating pressure reducer 24 according to the deviation ΔTd of the discharge temperature which is calculated in the step 270 is determined by searching from the map in FIG. 11 which is stored in ROM.

In the step 290, the opening degree KF of the heating expansion valve is calculated by adding the ΔKF to the present expansion valve opening degree. In the step 300, the heating pressure reducer 24 is so controlled that the real opening degree becomes to the opening degree KF. Then, it is returned to the step 120.

The map in FIG. 11 is so prepared that the increase and decrease value ΔKF becomes less than zero when the deviation ΔTd of the discharge temperature is less than zero, and the ΔKF equals 0 when the ΔTd equals 0. Thus, as a result of repeating the process of the steps 270 through 300, the opening degree of the heating pressure reducer 24 becomes small until the ΔTd becomes zero, that is, until the discharge refrigerant temperature of the compressor 21 becomes the setting temperature T1.

Figure 12:
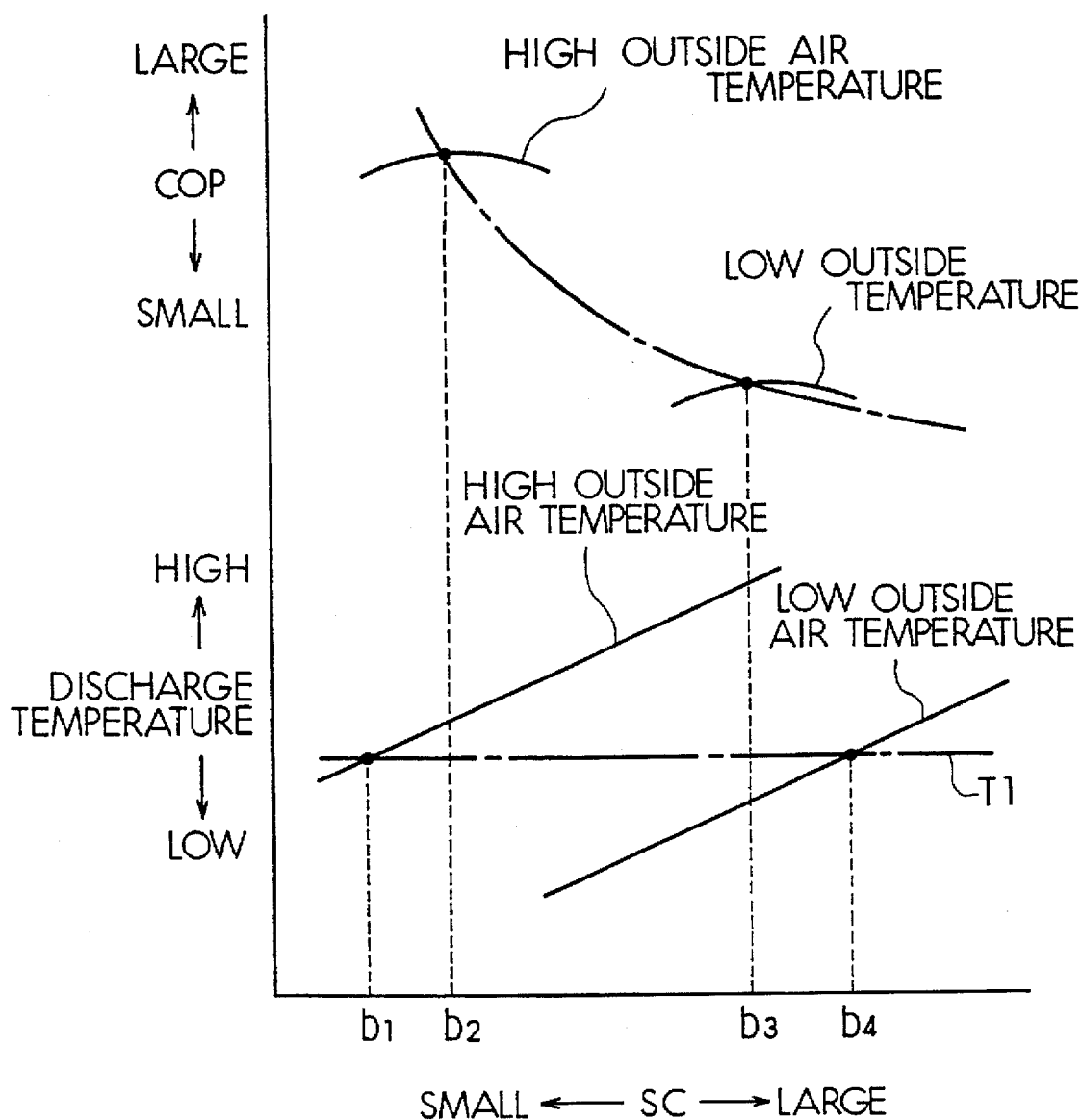
FIG. 12 is an experimental graph showing relationship between the supercooling degree SC, the discharge refrigerant temperature, coefficient of performance COP, and the outside air temperature in the first embodiment.

In defrosting in which the opening degree of the heating pressure reducer 24 is so controlled that the discharge refrigerant temperature becomes the setting temperature T1, when the outside air temperature is low (for example, −18° C.), as shown in FIG. 12, the SC becomes b4, which is larger than the SC (=b3) in the ordinary heating mode in which the opening degree of the heating pressure reducer 24 is so controlled that the COP is maximized.

Figure 13:
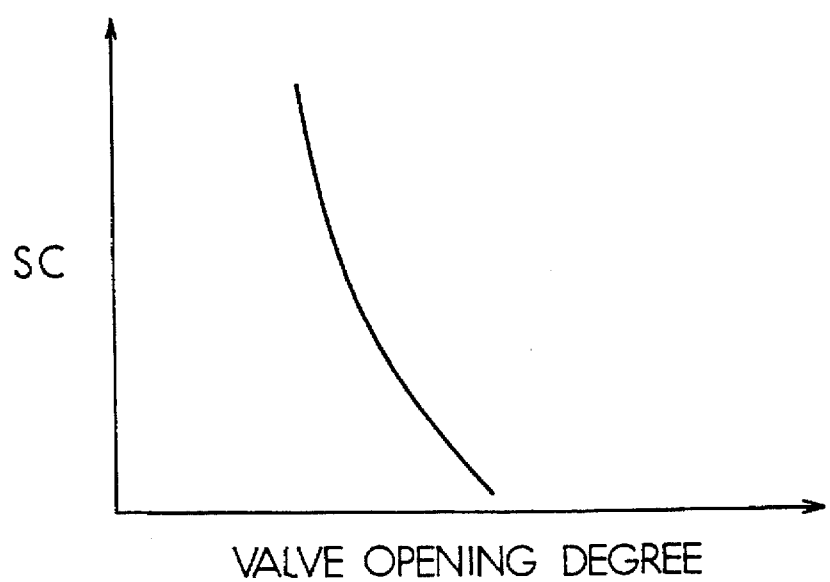
FIG. 13 is a view showing the relationship between the opening degree of the pressure reducer and the supercooling degree SC.

Can be understood from FIG. 13, when the SC becomes large, the opening degree of the heating pressure reducer 24 becomes small. Thus, when the outside air temperature is low, the opening degree (the second opening) of the heating pressure reducer 24 in the defrosting is smaller than the opening degree (the first opening) of the heating pressure reducer 24 in the ordinary heating mode.

Figure 14:
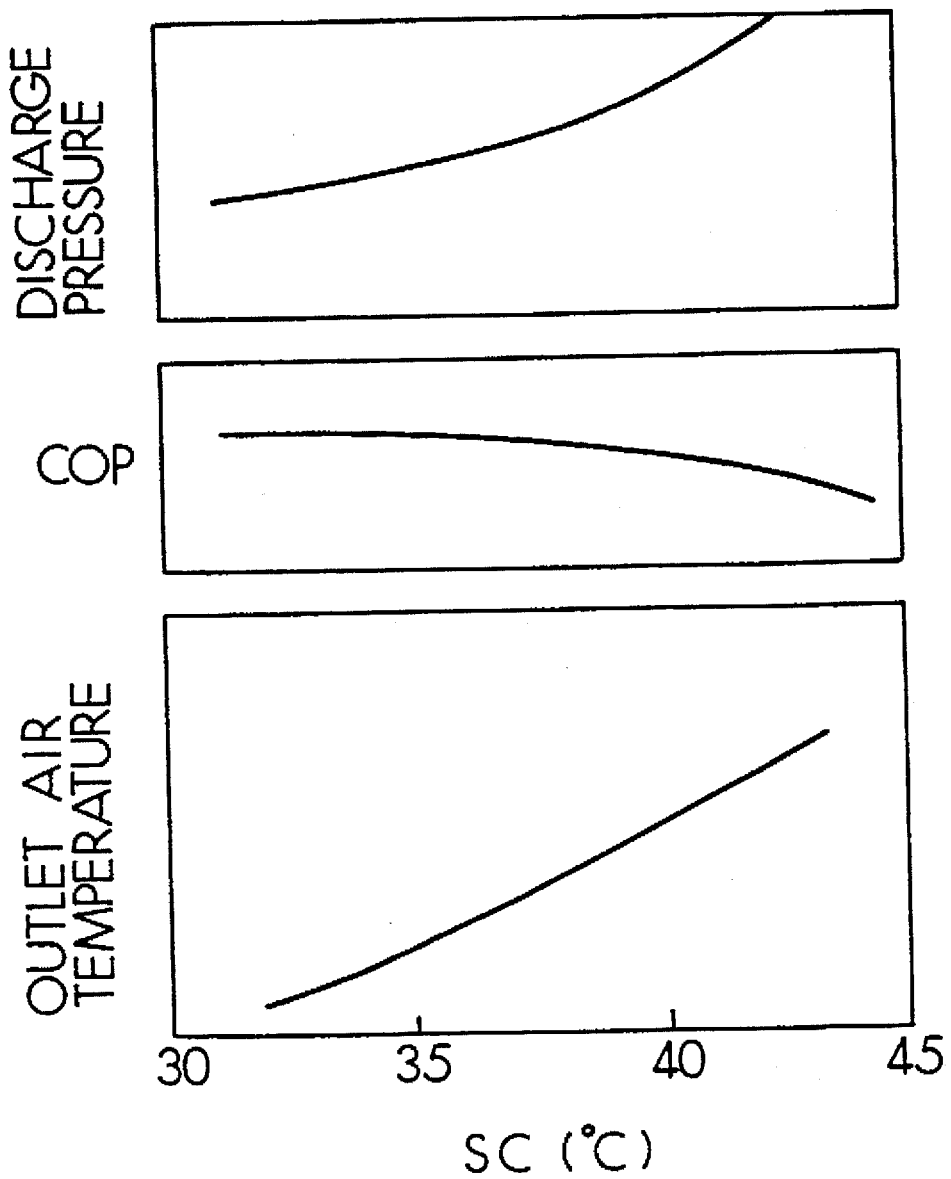
FIG. 14 is a graph showing the relationship between the supercooling degree SC, the discharge refrigerant pressure, the coefficient of performance COP, and the temperature of the air blowing into passenger compartment.

As shown in FIG. 14, when the SC becomes large as described above, the COP is decreased, however, on the other hand, the discharge refrigerant pressure and the discharge air temperature in the passenger compartment become high. That is, in the first embodiment, in the defrosting, the SC is increased until the discharge refrigerant temperature of the compressor 21 becomes to the setting temperature T1. As a result, the discharge air temperature becomes high.

As shown in FIG. 12, when the outside air temperature is high (for example, 0° C.), the SC (=b1) in the defrosting is smaller than the SC (=b2) in the ordinary heating mode. Therefore, the opening degree (the second opening degree) of the heating pressure reducer 24 in the defrosting is larger than the opening degree (the first opening degree) of the heating pressure reducer 24 in the ordinary heating mode. Further, in FIG. 13, an experimental data when the outside air temperature is 0° C. and the heat abstraction ability Q is 3.15 KW are shown, and in FIG. 14, an experimental data when the outside air temperature is −18° C. is shown.

In the first embodiment described above, when the operation mode of the refrigerating cycle 20 is a mode other than the heating operation mode, or when the operation mode of the refrigerating cycle 20 is the ordinary heating mode without inputting the defroster switch 52e, the opening degree of the pressure reducer 23 or 24 is so controlled that the COP is maximized. When the defroster switch 52e is input in the defrosting mode, even if the heating pressure reducer 24 is so controlled that the COP becomes a little smaller, the discharge air temperature is made high. Therefore, in the first embodiment, while performing the power saving operation in the ordinary operation mode, the defrosting of the front windshield glass can be sufficiently performed.

Further, in the first embodiment, the opening degree of the heating pressure reducer 24 when the defroster switch 52e is input is not controlled to be excessively small to increase the defrosting effect, the opening degree is made small until the discharge refrigerant temperature Td1 becomes to the setting temperature T1. Therefore, the increase of the consumed electric power of the compressor accompanied with the decrease of the opening degree of the pressure reducer can be minimized as needed.

Now, a second embodiment according to the present invention will be described.

In the first embodiment, the setting temperature T1 in the step 270 is so set that the defrosting of the front windshield glass can be sufficiently performed. However, in the second embodiment, the amount of electric current input to the inverter 31 or the amount of the electric current output from the inverter 31 is detected, the setting temperature T1 in the step 270 may be so set that the amount of the electric current becomes to a predetermined value. Here, the predetermined amount of the electric current in the second embodiment is a temperature in which the amount of heat generated by the inverter 31 becomes an upper limit of the tolerance. Thus, in this case, the amount of the heat generated by the inverter 31 is controlled, so that the inverter 31 can be normally kept on operating.

In the second embodiment, when the outside air temperature is low, the opening degree (the second opening degree) of the heating pressure reducer 24 in the defrosting is smaller than the opening degree (the first opening degree) of the heating pressure reducer 24 in the ordinary heating mode.

Next, a third embodiment according to the present invention will be described.

Figure 15:
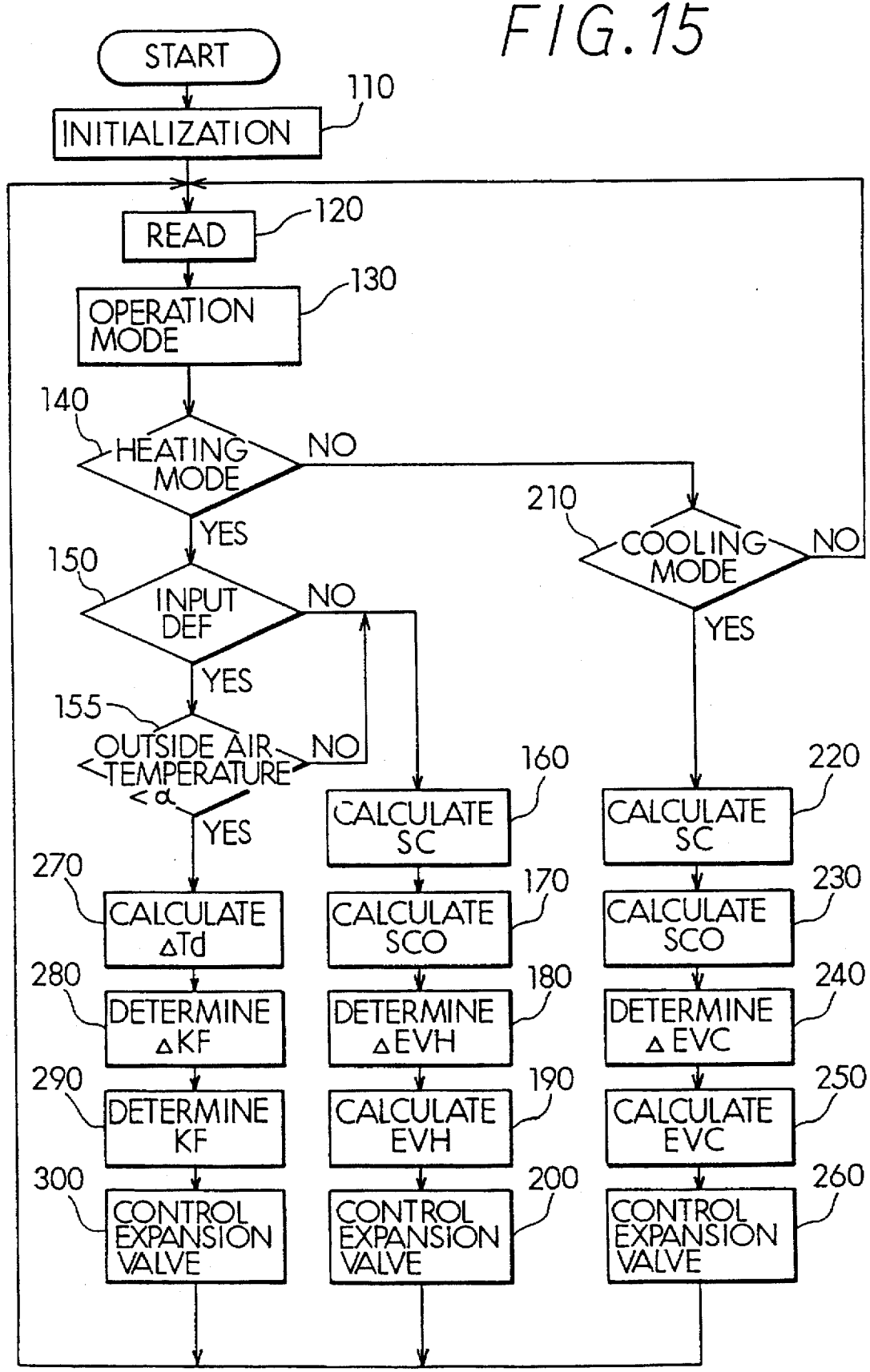
FIG. 15 is a flow chart showing control process of the pressure reducer according to a third embodiment of the present invention.

As shown in FIG. 15, a step 155 is further performed between the step 150 and the step 270 in the above embodiment. In the step 155, it is determined whether or not the detected value of the outside air temperature sensor 41 is lower than a predetermined temperature α. That is, it is determined whether or not the outside air temperature is approximately low enough to perform sufficiently the operation for the prevention of cloud, defogging, or defrosting of the front windshield glass in the ordinary control. When the determination is YES in all the steps 140 through 155, the process of the steps 270 through 300 may be performed.

In FIG. 15, when the determination is YES in the steps 140 and 150 and the determination is NO in the step 155, that is, when the front windshield glass is hardly clouded, the process of the steps 160 through 200 is performed. Therefore, in the third embodiment, the more power saving operation can be performed.

Then, a fourth embodiment according to the present invention will be described now.

In each of the above embodiments, the system in which the opening degree of the pressure reducer is so controlled that the supercooling degree SC becomes the target supercooling degree is described. However, in the fourth embodiment, means for detecting the air heating degree in the indoor heating heat exchanger 12 is further provided, and in the ordinary operation mode in which the operation for the prevention of the cloud, defogging, or defrosting is not operated, the opening degree of the pressure reducer (the first opening) may be so controlled that the COP is maximized based on the detected value of the detecting means.

When the defroster switch 52e is input, the opening degree of the pressure reducer (the second opening degree) may be so controlled that the detected value of the detecting means corresponds to a predetermined temperature where the operation for the prevention of cloud, the defogging, or the defrosting of the front windshield glass can be performed, or the discharge refrigerant temperature becomes the setting temperature T1 as shown in the first embodiment, or the electric current supplied to the inverter 31 becomes the predetermined value as shown in the second embodiment, or which are combined With each other.

In the fourth embodiment, the opening degree (the second opening degree) of the heating pressure reducer 24 in the defrosting mode becomes smaller than the opening degree (the first opening) of the heating pressure reducer 24 in the ordinary heating mode.

Then, a fifth embodiment according to the present invention will be described now.

In each of the above embodiments, the condenser (indoor heating heat exchanger 12) is located in the air conditioning duct 2, the air in the air conditioning duct 2 is directly heated by the heat of the condensation of the condenser. However, in the fifth embodiment, as show in FIG. 16, the condenser is constructed by a refrigerant water heat exchanger 21 which heat exchanges with warm water in a warm water circuit, the heat of the condensation heat generated in the refrigerant water heat exchanger 21 is supplied to the warm water in the warm water circuit 10 to heat the warm water. The air in the air conditioning duct 2 may be heated by flowing the warm water into a warm water type heat exchanger 11 which is located in the air conditioning duct 2.

Figure 16:
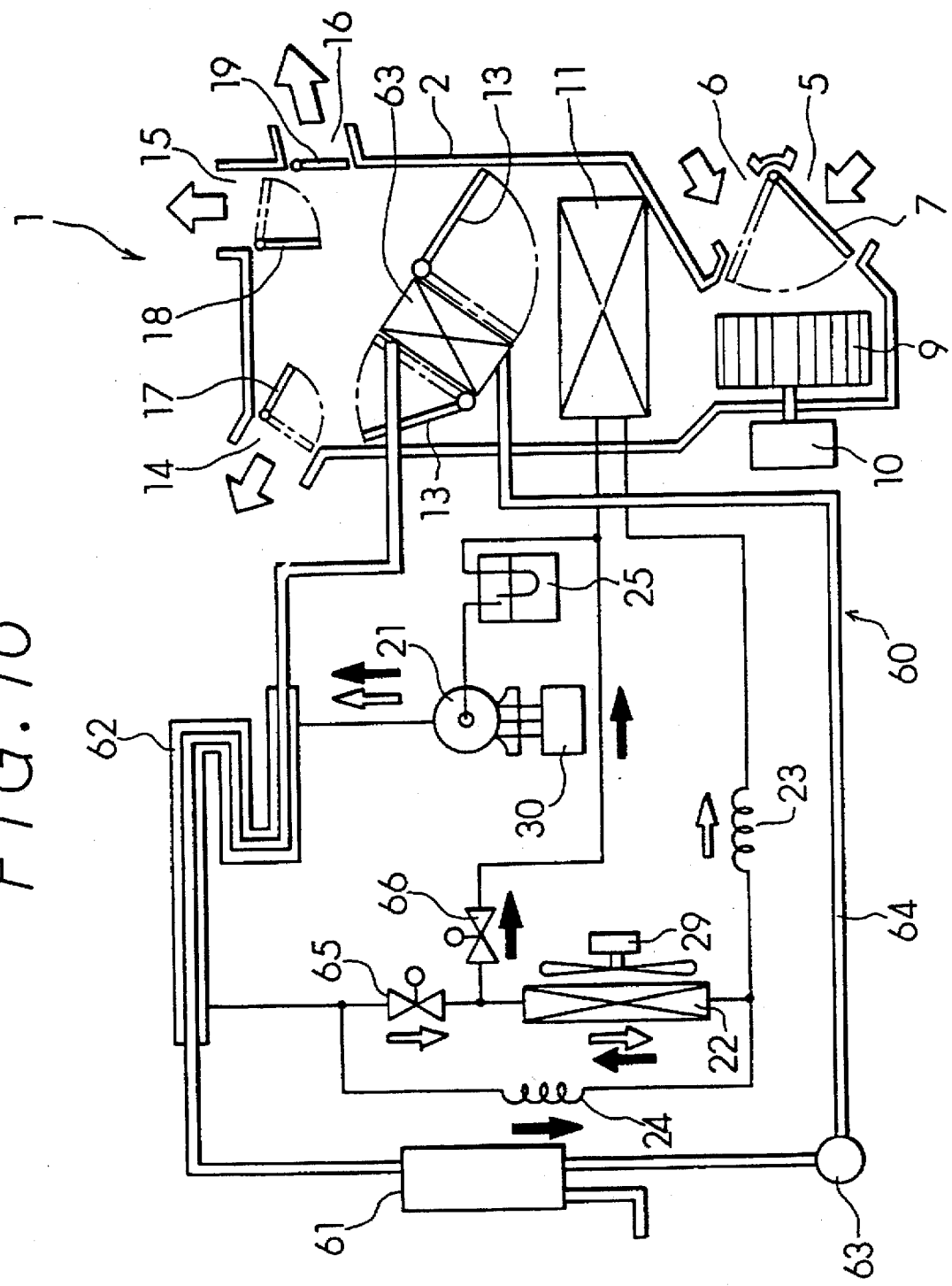
FIG. 16 is an overall construction view according to a fifth embodiment of the present invention.

In FIG. 16, the reference numeral 33 denotes a fuel type heater, the reference numeral 32 denotes a water pump, the reference numeral 34 denotes a warm pipe, and the reference numerals 26 and 27 denote solenoid valves.

Modifications of the embodiment are described.

The setting temperature T1 used in the step 270 may be set as a temperature in which the compressor 21 can be preserved.

Further, in the step 270, a deviation between the detected value of the discharge pressure sensor 43 and the setting pressure which is set to preserve the high-pressure is calculated, then in the step 280, the increase and decrease value of the valve opening degree may be calculated based on the pressure deviation of high-pressure. In this case, the defrosting effect can be increased to the extent that an abnormal high pressure is not applied the indoor heating heat exchanger 12 or the heating pressure reducer 24.

Further, the defrosting instruction signals generating means may be constructed with such as a sensor for outputting a signal when the cloud degree of the front windshield glass is more than a predetermined value.

Further, in each of the above embodiments, the present invention is applied to an air conditioner for electric vehicles. However, the present invention may be applied to an air conditioner for engine driving vehicles and for rooms in a house or building.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus comprising:

air blowing means for generating air flow;

a casing having an air passage therein, said air passage at least having a defroster air outlet at one end for blowing air generated by said air blowing means toward an inside surface of a windshield;

a refrigerating cycle having a compressor for compressing a refrigerant, a condenser for condensing the refrigerant from said compressor to heat air in said air passage by heat of condensation thereof, an electric expansion valve for decompressing the refrigerant from said condenser and an evaporator for evaporating the refrigerant from said electric expansion valve;

defrosting instruction signal generating means for generating a defrosting instruction signal which instructs a defrosting of said windshield;

defroster air outlet opening/closing means for opening and closing said defroster air outlet, said defroster outlet opening/closing means open said defroster air outlet to perform a defrosting of said windshield when said defrosting instruction signal generating means generates a defrosting instruction signal;

defrosting instruction signal determining means for determining whether said defrosting instruction signals generating means generates said defrosting instruction signal;

first expansion valve control means in which an opening degree of said electric expansion valve becomes a first opening degree when said defrosting instruction signal determining means determines that said defrosting instruction signal is not generated; and second expansion valve control means in which an opening degree of said electric expansion valve becomes an second opening degree which is smaller than said first opening degree when said defrosting instruction signal determining means determines that said defrosting instruction signal is generated.

2. An air conditioning apparatus according to claim 1, wherein said first opening degree is an opening degree in which a coefficient of performance of said refrigerating cycle is maximized.

3. An air conditioning apparatus according to claim 2, wherein said first opening degree in which said coefficient of performance of said refrigerating cycle is maximized is an opening degree in which a supercooling degree of a liquid refrigerant in said condenser becomes a predetermined value.

4. An air conditioning apparatus according to claim 2, further comprising:

heating degree detecting means for detecting a heating degree of said condenser;

wherein said first opening degree in which said coefficient of performance of the refrigerating cycle is maximized is an opening degree in which said heating degree detected by said heating degree detecting means becomes a predetermined value.

5. An air conditioning apparatus according to claim 4, wherein said second opening degree is an opening degree in which said heating degree detected by said heating degree detecting means is larger than said predetermined value.

6. An air conditioning apparatus according to claim 1, further comprising:

an electric motor for driving said compressor; and discharge temperature detecting means for detecting temperature of the refrigerant discharged from said compressor;

wherein said second opening degree is an opening in which the discharge refrigerant temperature detected by said discharge temperature detecting means becomes a predetermined value.

7. An air conditioning apparatus according to claim 1, further comprising:

an electric motor for driving said compressor;

an inverter for controlling an electric current supplied to said electric motor; and electric current detecting means for detecting the electric current supplied to said inverter;

wherein said second opening degree is an opening in which said current detected by said electric current detecting means becomes a predetermined value.

8. An air conditioning apparatus according to claim 1, further comprising:

outside air temperature detecting means for detecting temperature of outside air; and outside air temperature determining means for determining whether said outside air temperature detected by said outside air temperature detecting means is less than a predetermined value, wherein said expansion valve control means in defrosting are so constructed that said opening degree of said electric expansion valve is set to said first opening when said defrosting instruction signal determining means determines that said defrosting instruction signal is generated and said outside air temperature determining means determines that said detected outside air temperature is more than said predetermined value, and said expansion valve control means in defrosting are so constructed that said opening degree of said electric expansion valve is set to said second opening degree when said defrosting instruction signal determining means determines that said defrosting instruction signal is generated and said outside air temperature determining means determines that said detected outside air temperature is less than said predetermined value.

9. An air conditioning apparatus according to claim 1, wherein said condenser is installed in said air passage to heat said air in said air passage by the heat of condensation thereof.

10. An air conditioning apparatus according to claim 1, wherein said air conditioning apparatus is for use in electric vehicles.

11. An air conditioning apparatus comprising:

air blowing means for generating air flow;

a casing having an air passage therein, said air passage having at least a defroster air outlet at one end for blowing air generated by said air blowing means toward an inside surface of a windshield;

a refrigerating cycle having a compressor for compressing a refrigerant, a condenser for condensing the refrigerant from said compressor to heat air in said air passage by heat of condensation thereof, an electric expansion valve for decompressing the refrigerant from said condenser and an evaporator for evaporating the refrigerant from said electric expansion valve;

defrosting instruction signal generating means for generating a defrosting instruction signal which instructs a defrosting of said windshield;

defroster air outlet opening/closing means for opening and closing said defroster air outlet, said defroster outlet opening/closing means open said defroster air outlet to perform a defrosting of said windshield when a defrosting instruction signal is generated; and control means for controlling an opening degree of said electric expansion valve to a first opening degree when a defrosting instruction signal is generated and for controlling said opening degree of said electric expansion valve to a second opening degree which is smaller than said first opening degree when a defrosting instruction signal generating means is not generated.

12. An air conditioning apparatus according to claim 11, wherein said defrosting instruction signal generating means is manually operated.

13. An air conditioning apparatus according to claim 11, wherein said refrigerating cycle is a heat pump type refrigerating cycle.

14. An air conditioning apparatus according to claim 11, further comprising:

outlet temperature detecting means detecting outlet refrigerant temperature of said condenser;

high pressure detecting means for detecting high pressure of said refrigerant cycle;

a control unit for controlling said electric expansion valve so that a supercooling degree of liquid refrigerant in said condenser is set to a predetermined target supercooling degree;

refrigerant supercooling degree calculating means for calculating said supercooling degree of condensed liquid refrigerant in said condenser based on the condensed temperature calculated from said high pressure detected by said high pressure detecting means and said outlet refrigerant temperature detected by said outlet temperature detecting means; and supercooling degree controlling means for controlling said electric expansion valve in such a manner that said supercooling degree calculated by said supercooling degree calculating means is set to said target supercooling degree.

15. An air conditioning apparatus according to claim 14, further comprising:

air amount detecting means for detecting air amount passing through said condenser; and target supercooling degree calculating means for calculating said target supercooling degree as a larger value in accordance with the increase of said air amount detected by said air amount detecting means.

\* \* \* \* \*